United States Patent

Seidensticker et al.

[11] Patent Number: 5,896,106
[45] Date of Patent: Apr. 20, 1999

[54] METHOD FOR DETERMINING THE ROLL ATTITUDE OF A ROLLING FLYING OBJECT

[75] Inventors: Jens Seidensticker, Bodman-Ludwigshafen; Wolfgang Kreuzer, Stockach, both of Germany

[73] Assignee: Oerlikon Contraves GmbH, Stockach, Germany

[21] Appl. No.: 08/585,422

[22] Filed: Jan. 11, 1996

[30] Foreign Application Priority Data

Jan. 14, 1995 [DE] Germany .................. 195 00 993

[51] Int. Cl.$^6$ .................................................. G01S 1/02
[52] U.S. Cl. .................. 342/428; 244/3.1; 244/3.11
[58] Field of Search .................. 342/428, 355, 342/357, 359; 244/3.1, 3.11; 73/178 R; 701/3, 4

[56] References Cited

U.S. PATENT DOCUMENTS

| | | | |
|---|---|---|---|
| 3,133,283 | 5/1964 | Ghose | 343/100 |
| 4,405,986 | 9/1983 | Gray | 701/3 |
| 4,910,524 | 3/1990 | Young et al. | 342/354 |
| 5,101,356 | 3/1992 | Tomothy et al. | 364/449 |
| 5,258,764 | 11/1993 | Malinowski | 342/359 |
| 5,372,334 | 12/1994 | Cuadros | 244/3.11 |
| 5,379,968 | 1/1995 | Grosso | 244/3.21 |
| 5,414,430 | 5/1995 | Hansen | 342/188 |
| 5,685,504 | 11/1997 | Schneider et al. | 244/3.11 |

*Primary Examiner*—Ronald Biegel
*Attorney, Agent, or Firm*—Bachman & LaPointe, P.C.

[57] ABSTRACT

In a method for determining the roll attitude of a rolling flying object having a radio receiver, in particular for guiding a ballistic flying projectile/rocket having roll compensation, the aim is to determine a line of sight between a transmitting source and the antenna and to determine the roll attitude therefrom.

5 Claims, 1 Drawing Sheet

METHOD FOR DETERMINING THE ROLL ATTITUDE OF A ROLLING FLYING OBJECT

BACKGROUND OF THE INVENTION

The invention relates to a method for determining the roll attitude of a rolling flying object having a radio receiver, in particular for guiding a ballistic flying projectile/rocket having roll compensation.

In the case of ballistic flying projectiles/rockets, but also in the case of other flying objects, the determination of the roll attitude is of decisive importance if subsequent guidance of these flying objects is to be performed during the mission. This holds, in particular, for guiding ballistic flying projectiles/rockets in which the possibility of a flight trajectory correction is provided, as is described in German Patent Application P 44 01 315.9, for example.

The present case is principally concerned with flying objects whose rotary movement about the roll axis is particularly pronounced. The rotary movements about the other body axes (pitch movement and yaw movement) are slight by comparison therewith. It is assumed in this case that the position and the velocity vector of the flying object are known by measurement Furthermore, flying objects having quasi-stable, that is to say slowly varying, roll frequency are considered, since it is only for this type of movement that the method presented here can reliably determine the roll attitude not only at individual instants.

To date, roll attitudes have been determined by means of position reference gyros or other inertial reference systems. These devices or systems are mechanical precision instruments and therefore correspondingly expensive

SUMMARY OF THE INVENTION

The object of the present invention is to develop a method of the above-mentioned type by means of which a relatively precise determination of the roll attitude of the flying object is performed, and which presupposes a substantially smaller outlay. The outlay is particularly small when the antenna equipment and receiver equipment are already present for other compelling reasons.

This object is achieved by determining a line of sight between a transmitting source and the antenna.

The roll attitude is determined from this line of sight in conjunction with known parameters In this case, the method requires a device for radio reception and an evaluation unit. It is preferred to use a radio receiver already present in the rocket or in the flying object. Again, it is preferred to use satellites, such as TV satellites, weather satellites and NAVSTAR satellites, which are already present as transmitting source, but ground-based or vehicle-mounted transmitting sources are also conceivable.

If a GPS (Global Positioning System) is already present in the projectile/rocket for the purpose of determining position, the antenna/antennas thereof and the NAVSTAR satellites can also be used to determine roll attitude. The outlay is kept to a minimum in this way.

The basic idea of the present invention is that the line of sight between the satellite and antenna is partly interrupted by the shading of the antenna when the flying body rolls. This means that a signal measure, represented over time, forms, for example, intensity saddles in which the antenna receives the signals from the transmitting source. Situated therebetween are shaded regions in which no reception takes place.

It is preferred for the received signal to be averaged. In this case three possibilities are conceivable, specifically that firstly the averaging time lasts less than ½ a revolution, secondly that it is equal to the duration of ½ a revolution, or thirdly that it is greater than the duration of ½ a revolution.

The roll frequency is determined from the ascending edge and/or the descending edge of the signal measure. The middle of the signal measure indicates the instant, delayed by the known system dead time, at which the line of sight between the flying object and transmitting source and the principal axis of the antenna approximate one another to the maximum extent.

Given a knowledge of the position of the flying object via, for example, the Global Positioning System (GPS), the geostationary coordinate system is also fixed, and the reference for the roll angle is thus provided. It is now possible, in turn, from the knowledge of the position of the flying object and satellite to determine the direction of the line of sight. The velocity vector of the flying object is selected as reference for the roll axis. The coordinate system fixed to the flying object and the geostationary coordinate system can be coordinated from the roll axis and line of sight, and it is possible from this to determine the roll attitude at the instant at which the principal axis of the antenna approximates to the line of sight to the maximum extent. Between these instants, the roll angle is determined from the roll frequency and the period since the last reference measurement.

It is, of course, also within the scope of the invention to use a plurality of transmitting sources for the determination, and to arrange a plurality of receiving antennas distributed on the circumference of the flying object. These possibilities permit an even more precise determination of the roll attitude.

BRIEF DESCRIPTION OF THE DRAWINGS

Other advantages, features and details of the invention may be seen from the following description of preferred exemplary embodiments, as well as with the aid of the drawing, in which.

DETAILED DESCRIPTION

Figure 1:
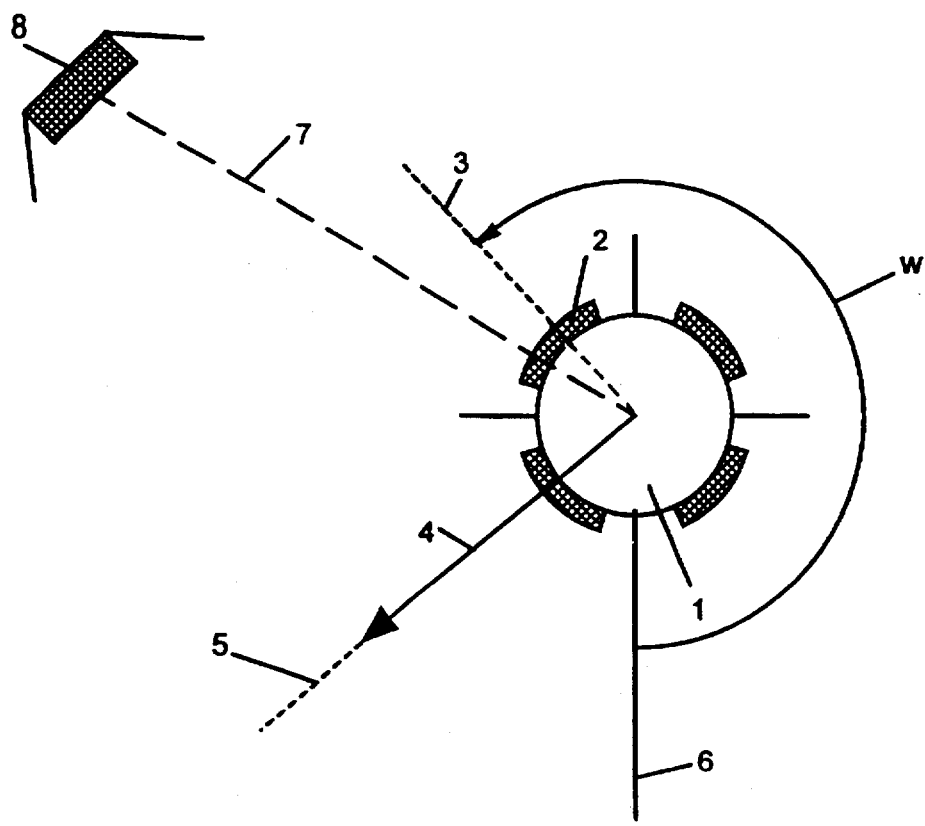
FIG. 1 shows a diagrammatic representation of the relationship between a flying body and a satellite.

A flying object 1 having an antenna 2 and a principal axis 3 of the antenna is represented diagrammatically in FIG. 1. This flying object has a velocity vector 4 and a roll axis 5. The arrow w represents the roll angle of the flying object 1 with respect to a vertical reference axis (VRA) 6. A line 7 of sight to a satellite or transmitter 8 is indicated by dashes.

Determination of the roll attitude of the flying object 1 is performed with the aid of this line 7 of sight, the position of the satellite or transmitter 8 and its transmit frequency being known.

Figure 2:
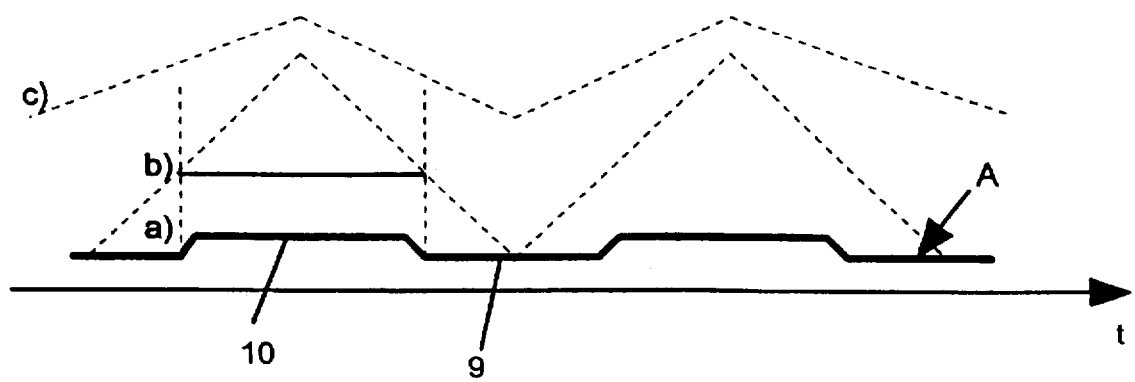
FIG. 2 shows a diagrammatic representation of the method according to the invention for determining the roll attitude of a flying object.

The present method functions in the following way:

The rolling movement of the flying object 1 causes its body partly to shade the antenna 2 mounted on the flying object 1. This means that there are periods with reception and periods without reception. The signal measure considered is marked by A in the diagram according to FIG. 2. If the signal measure A (represented here as an intensity) is plotted against time t, there are shaded regions 9 and, therebetween, signal characteristics 10 in which the antenna 2 can receive signals from the satellite or transmitter 8. The separation of two signal characteristics 10 is $2\pi/f$, f being the roll frequency of the flying object.

By tuning receiver circuits sharply and by specially conditioning the received signals the useful signal of the satellite or transmitter 8 is detected against the background noise and a signal is formed therefor. In this case, the absolute signal measure is not an evaluation criterion; it is the qualitative variation over time which is decisive.

The roll attitude is determined by evaluating the averaged signal characteristic 10. A plurality of possibilities are conceivable in this case. The possibility of an averaging time which is less than the duration of ½ a revolution is indicated by a), b) is the averaging time for a duration of ½ a revolution, and c) is the averaging time in the case of a duration of revolution greater than ½.

The roll frequency is determined from the ascending edge and/or the descending edge of the signal measure or of the intensity saddle 10. The middle of each intensity saddle indicates the instant, delayed by the known system dead time (evaluation time), at which the principal axis 3 of the antenna approximates to the maximum extent to the line 7 of sight between the flying object 1 and the transmitter.

Normally, the position of the flying object 1 is determined independently of the present method. This is performed, for example, via the known GPS system (Global Positioning System), with the aid of which the position values of the projectile/rocket are determined. Knowing the position of the flying object 1, the direction of the VRA 6 is also known. The direction of the line 7 of sight can now be determined from the positions of the flying object 1 and satellite or transmitter 8. The velocity vector 4 is selected in this case as reference value for the roll axis 5 of the flying object 1.

The roll axis 5, VRA 6 and line 7 of sight permit the determination of the roll attitude of a reference point (for example, center of the antenna) at the instant at which the principal axis of the antenna coincides with the line 7 of sight. The roll angle w is calculated between these instants, specifically from the roll frequency and the period since the last reference measurement.

What is claim is:

1. A method for determining the roll attitude of a rolling flying object having a radio receiver which comprises determining a direct line of sight from a transmitter to an antenna of the radio receiver, and providing at least one of a plurality of transmitters and a plurality of antennas distributed over the circumference of the flying object to determine the roll attitude.

2. A method for determining the roll attitude of a rolling flying object having a radio receiver, which comprises determining a direct line of sight from a transmitter to an antenna of the radio receiver, and determining the position and vertical reference axis of the flying object by means of a global positioning system.

3. The method as claimed in claim 2, including using the velocity vector of the flying object as a reference value for the roll axis.

4. The method as claimed in claim 3, including using the roll axis, vertical reference axis and line of sight to determine the roll attitude of a reference point at the instant at which the principal axis of the antenna approximates to the line of sight to the maximum extent.

5. The method as claimed in claim 3, including determining the roll angle of the flying object from the roll frequency between periods since the previous reference measurement.

* * * * *